United States Patent
Mains, Jr.

(10) Patent No.: US 11,390,213 B2
(45) Date of Patent: *Jul. 19, 2022

(54) METHODS, APPARATUSES, AND SYSTEMS FOR MONITORING STATE OF A TRANSPORTATION SYSTEM

(71) Applicant: Cross Road Centers, LLC, Kenner, LA (US)

(72) Inventor: Ronald H. Mains, Jr., Kenner, LA (US)

(73) Assignee: CRC R&D, LLC, Kenner, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,279

(22) Filed: Jan. 24, 2018

(65) Prior Publication Data
US 2018/0147983 A1    May 31, 2018

Related U.S. Application Data

(63) Continuation of application No. 14/928,370, filed on Oct. 30, 2015, now Pat. No. 9,914,392.
(Continued)

(51) Int. Cl.
*B60Q 9/00* (2006.01)
*B62D 53/06* (2006.01)
(Continued)

(52) U.S. Cl.
CPC ............... *B60Q 9/00* (2013.01); *B60Q 1/50* (2013.01); *B60Q 5/005* (2013.01); *B62D 53/00* (2013.01);
(Continued)

(58) Field of Classification Search
CPC . B60Q 1/50; B60Q 5/005; B60Q 9/00; B62D 53/00; B62D 53/06; B62D 53/08; B62D 53/0871; F41A 33/06
(Continued)

(56) References Cited

U.S. PATENT DOCUMENTS

| 4,161,682 A | 7/1979 | Corvette |
| 4,682,145 A * | 7/1987 | Brawner, Jr. ............ G01C 9/14 180/282 |

(Continued)

FOREIGN PATENT DOCUMENTS

| EP | 2634018 | 9/2013 |
| WO | 1994/008804 | 4/1994 |
| WO | 2001/094151 | 12/2001 |

OTHER PUBLICATIONS

Meritro Wabco, SmartTrac Stability Control Systems, http:www.meritorwabco.com/MeritorWABCO_document/SP1079.pdf, 2010.

*Primary Examiner* — An T Nguyen
(74) *Attorney, Agent, or Firm* — Jason P. Mueller; FisherBroyles, LLP (57) ABSTRACT

Embodiments of the present disclosure include methods, apparatuses, and systems for receiving feedback during transport. Embodiments include a transportation system comprising a tractor, a dolly attached to opposing ends of a first and second trailer, and a sensor feedback system. Sensor feedback system may include a tilt sensor system mounted on at least one of the dolly, the first trailer, and the second trailer, and a user feedback system mounted within the tractor. Tilt sensor system may measure tilt of at least one of the dolly, first and second trailers, and first and second containers attached to the first and second trailers, to obtain tilt information, and send tilt information to the user feedback system via a communication system. User feedback system may receive the tilt information and alert a driver of the tractor if the tilt information is above a predetermined level.

14 Claims, 6 Drawing Sheets

Related U.S. Application Data (60) Provisional application No. 62/072,543, filed on Oct. 30, 2014.

(51) Int. Cl.
  *B62D 53/08* (2006.01)
  *B60Q 5/00* (2006.01)
  *B60Q 1/50* (2006.01)
  *B62D 53/00* (2006.01)
  *F41A 33/06* (2006.01)

(52) U.S. Cl.
  CPC .............. *B62D 53/06* (2013.01); *B62D 53/08* (2013.01); *B62D 53/0871* (2013.01); *F41A 33/06* (2013.01)

(58) Field of Classification Search
  USPC .................................................. 340/440, 431
  See application file for complete search history.

(56) References Cited

U.S. PATENT DOCUMENTS

| | | | |
|---|---|---|---|
| 4,952,908 A | | 8/1990 | Sanner |
| 5,825,284 A | * | 10/1998 | Dunwoody ........ B60G 17/0162 340/440 |
| 6,128,076 A | * | 10/2000 | Sackett .................... G01C 9/06 356/249 |
| 6,152,252 A | | 11/2000 | Pettersson |
| 6,450,523 B1 | | 9/2002 | Masters et al. |
| 6,452,487 B1 | | 9/2002 | Krupinski |
| 6,970,772 B2 | | 11/2005 | Radtke et al. |
| 7,501,942 B2 | * | 3/2009 | Theisen ................. B60R 21/013 340/425.5 |
| 7,698,036 B2 | * | 4/2010 | Watson ............. B60R 21/01552 701/45 |
| 7,880,595 B2 | | 2/2011 | Shimura |
| 8,150,613 B2 | | 4/2012 | Engelhard |
| 8,380,390 B2 | | 2/2013 | Sy et al. |
| 2001/0022731 A1 | | 9/2001 | Dupay |
| 2003/0195668 A1 | * | 10/2003 | Radtke ................... H04B 3/548 701/1 |
| 2005/0174223 A1 | | 8/2005 | Egami |
| 2007/0194557 A1 | | 8/2007 | Caporali et al. |
| 2008/0040005 A1 | * | 2/2008 | Breed ...................... B60J 10/00 701/48 |
| 2008/0169144 A1 | * | 7/2008 | DeGrave ................... B60L 7/08 180/165 |
| 2008/0208416 A1 | | 8/2008 | Yuet |
| 2010/0214094 A1 | | 8/2010 | Givens |
| 2010/0231014 A1 | | 9/2010 | Gibree |
| 2011/0022267 A1 | | 1/2011 | Murphy |
| 2012/0072109 A1 | * | 3/2012 | Waite ..................... B60K 35/00 701/431 |
| 2012/0080866 A1 | | 4/2012 | West |
| 2012/0313769 A1 | | 12/2012 | Holbert |
| 2013/0166198 A1 | * | 6/2013 | Funk ....................... G08G 1/20 701/446 |
| 2013/0253814 A1 | | 9/2013 | Wirthlin |
| 2015/0239409 A1 | | 8/2015 | Mousa |

\* cited by examiner

METHODS, APPARATUSES, AND SYSTEMS FOR MONITORING STATE OF A TRANSPORTATION SYSTEM

This application is a continuation of U.S. patent application Ser. No. 14/928,370, filed Oct. 30, 2015, which claims the benefit of U.S. Provisional Patent Application No. 62/072,543, filed on Oct. 30, 2014, each of which are incorporated herein by reference.

Efficient tractor transport of heavy and/or bulky loads has been hindered in the trucking industry by inefficient axel loading. Hauling heavy loads in single trailers and containers has not been possible because of the weight such loads place on individual axles. Large individual axle loads have been known to cause damage to roadways and have been banned by various local, state, and federal governments. Indeed, loads that exceed legal limits for maximum axle weight have often been broken down into smaller loads that are transported by multiple tractors. Bulky loads have posed similar issues. Trailers may only be partially loaded because of the shape and configuration of the containers they are transporting, for example, plane, shipping and/or train containers. For example, a single shipping/train container is often pulled by a single tractor well below axle weight maximums.

Another issue with tractor transport of freight using trailers and/or containers involves the tilt that occurs when making a turn using the tractor. When a driver makes a turn, it is usually normal for the trailers and/or containers to tilt along the roll axis. However, if the driver turns at an excessive speed or if the turn itself is hazardously sharp, the trailers and/or containers may tilt excessively, which may damage the freight inside the containers. In some instances, the containers may overturn, potentially injuring the driver and/or other drivers and pedestrians.

DESCRIPTION OF EMBODIMENTS

Methods, apparatuses, and systems are provided for transporting multiple trailers and containers via a dolly system. Embodiments provide a freight transportation system having a dolly system. In embodiments, a two axle dolly system may be secured to multiple trailers and/or containers. Dolly system may be used to safely and securely distribute axle weights and allow for maneuverability of the overall freight transportation system.

Embodiments provide for methods, apparatuses, and systems for receiving feedback regarding the degree of tilt of a dolly and/or trailers, and/or attached containers. In some embodiments, a sensor feedback system may be integrated into a freight transportation system as described herein. In an embodiment, the sensor feedback system may include a tilt sensor system mounted on a frame of the dolly or trailers attached to the dolly, and a user feedback system located within a cabin of a tractor attached to the dolly. Tilt sensor system may measure the tilt of the dolly and/or trailers, as well as attached containers, to obtain related tilt information, and continuously send the tilt information to the user feedback system. User feedback system may then vibrate/alert a driver of the tractor if the tilt information is above a predetermined/dangerous level. User feedback system may be a haptic feedback system, audio feedback system, visual feedback system, and/or audiovisual feedback system.

Figure 1:
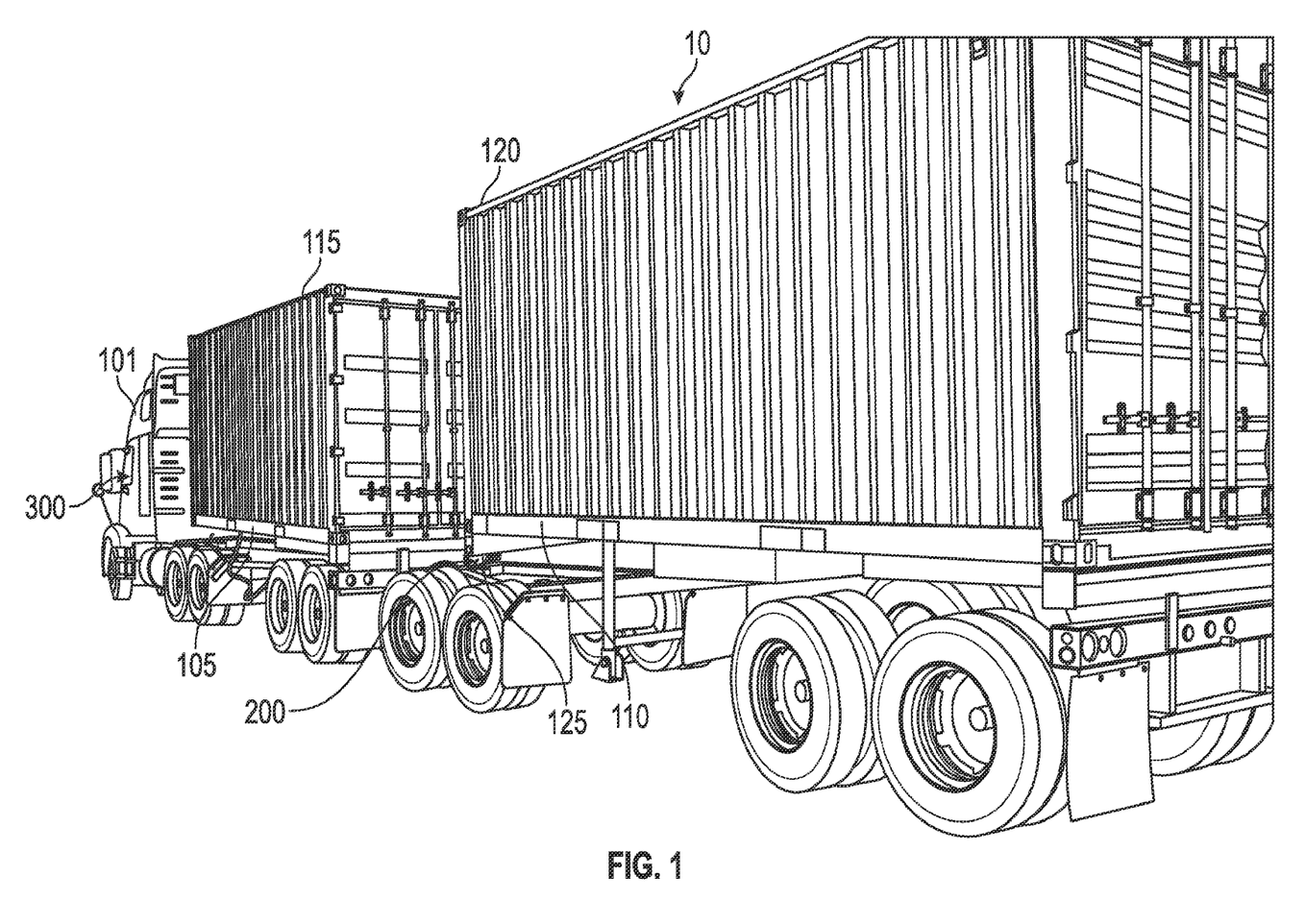
FIG. 1 is an isometric view of a freight transportation system, according to an exemplary embodiment of the present disclosure.

Referring to FIG. 1, a freight transportation system (10) is shown. Tractor (101) is coupled to a first trailer (105). First container (115) is secured to top of first trailer (105). Two axle dolly (125) is coupled to the first trailer (105) and a second trailer (110). Second container (120) is secured to top of second trailer (110). Two axle dolly (125) distributes the weight of the first and second trailer (105, 110) across its tandem axles.

Tractor (101) may refer to a heavy-duty commercial vehicle. In embodiments, tractor (101) may have two load axles (e.g., as seen in FIG. 1) or three load axles. In various instances, the load axles of tractor (101) may include single, tandem, or tridem tires. Examples of commercially available tractors (101) include Volvo™ VNL and VNM series trucks. However, other types of tractors (101) commonly used to transport freight may also be used.

First and second trailers (105, 110) may include one, two, or more front axels and one, two, or more rear axles. First and second trailers (105, 110) may be 102 inches wide. In various instances, the axles of first and second trailers (105, 110) may include single, tandem, or tridem tires. First and second trailers (105, 110) as used herein may refer to a box, van, or flatdeck. An example of a commercially available trailer (105, 110) that may be used is a Transcraft™ flat deck trailer. However, other types of trailers (105, 110) commonly used to transport freight and/or house a container may also be used.

First and second trailers (105, 110) may support the first and second containers (115, 120). First and second containers (115, 120) may be "Intermodal" and designed to be moved from one mode of transport to another (e.g. from ship, to rail, to truck). First and second containers (115, 120) may be slid into a box trailer or placed onto a flatdeck trailer. First and second containers (115, 120) may be shipping containers.

Figure 2:
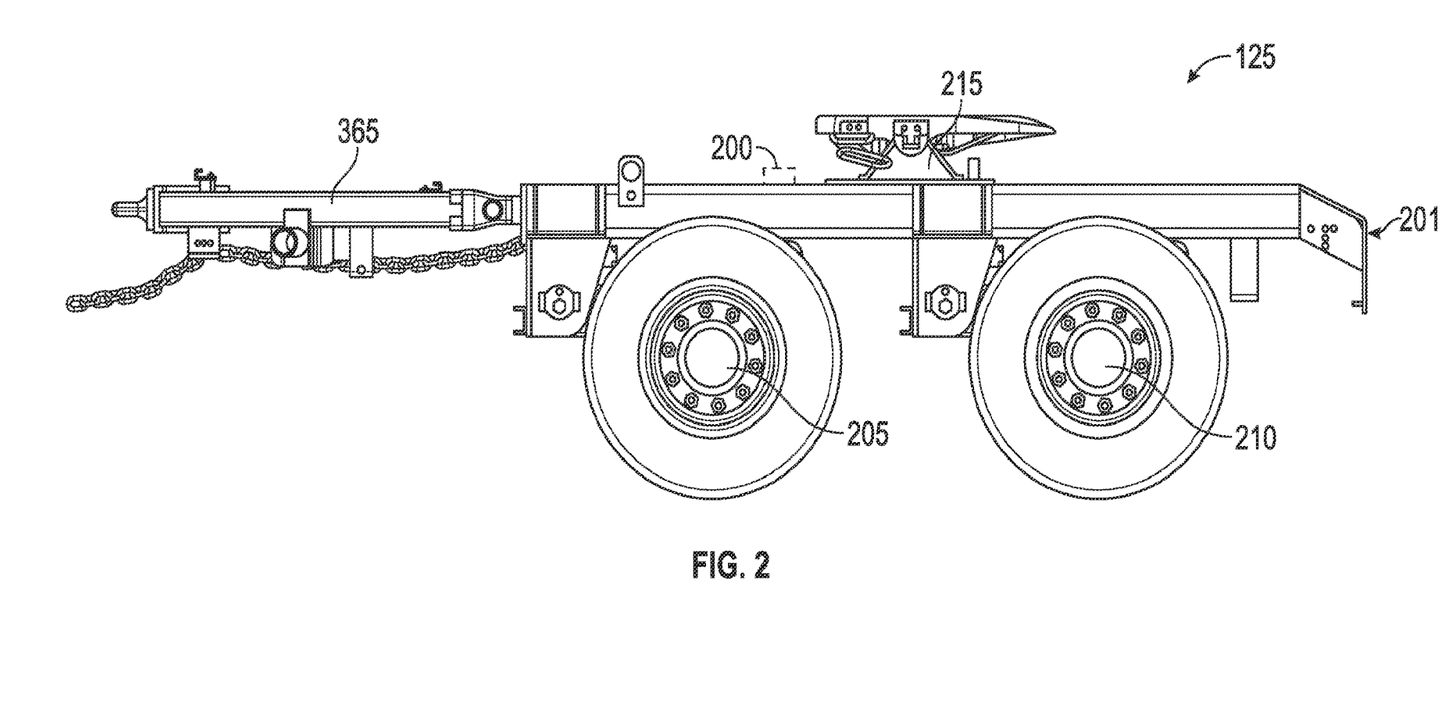
FIG. 2 is a side view of a two axle dolly, according to an exemplary embodiment of the present disclosure.
Figure 3:
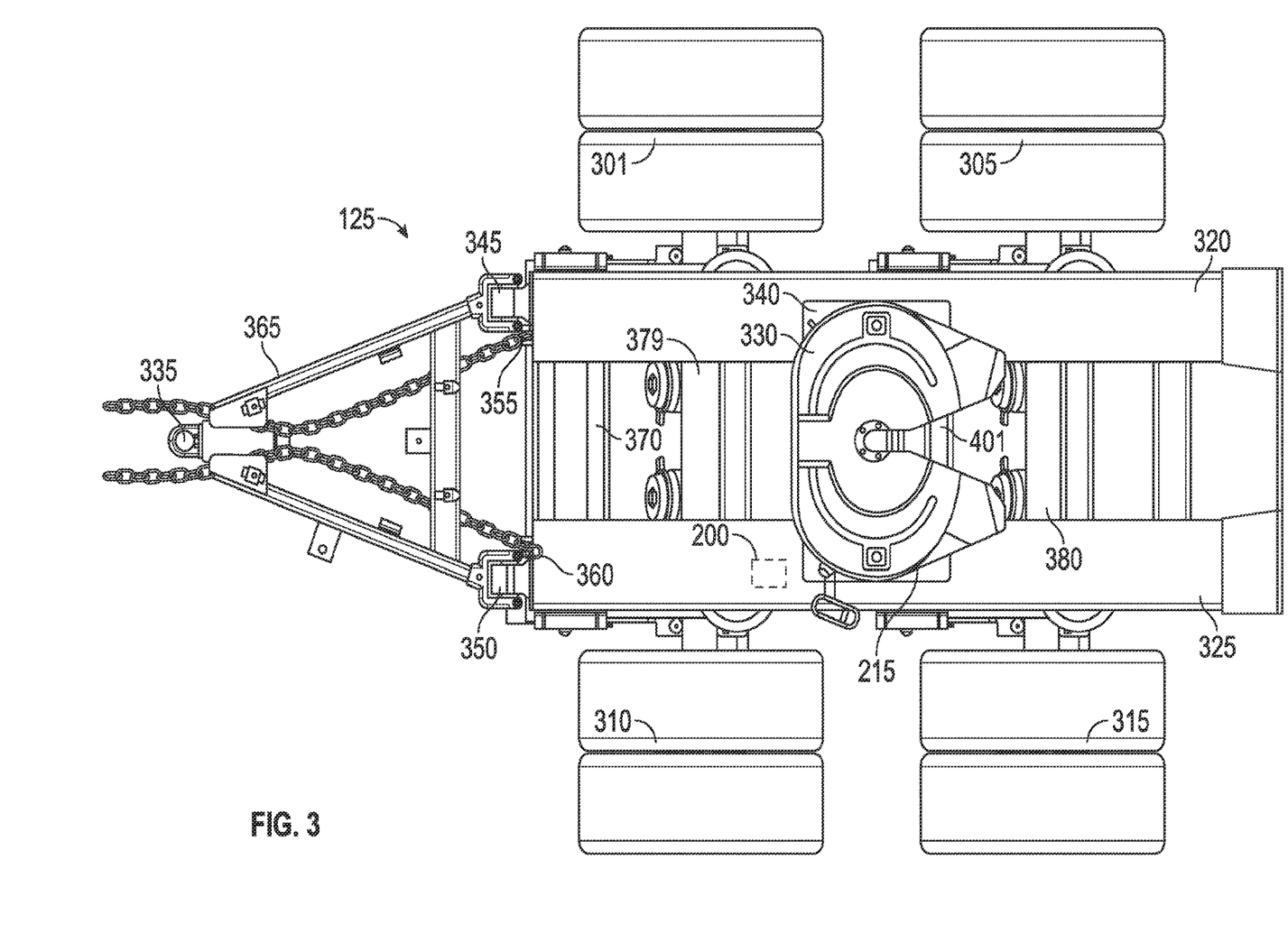
FIG. 3 is a top view of the two axle dolly shown in FIG. 2.
Figure 4:
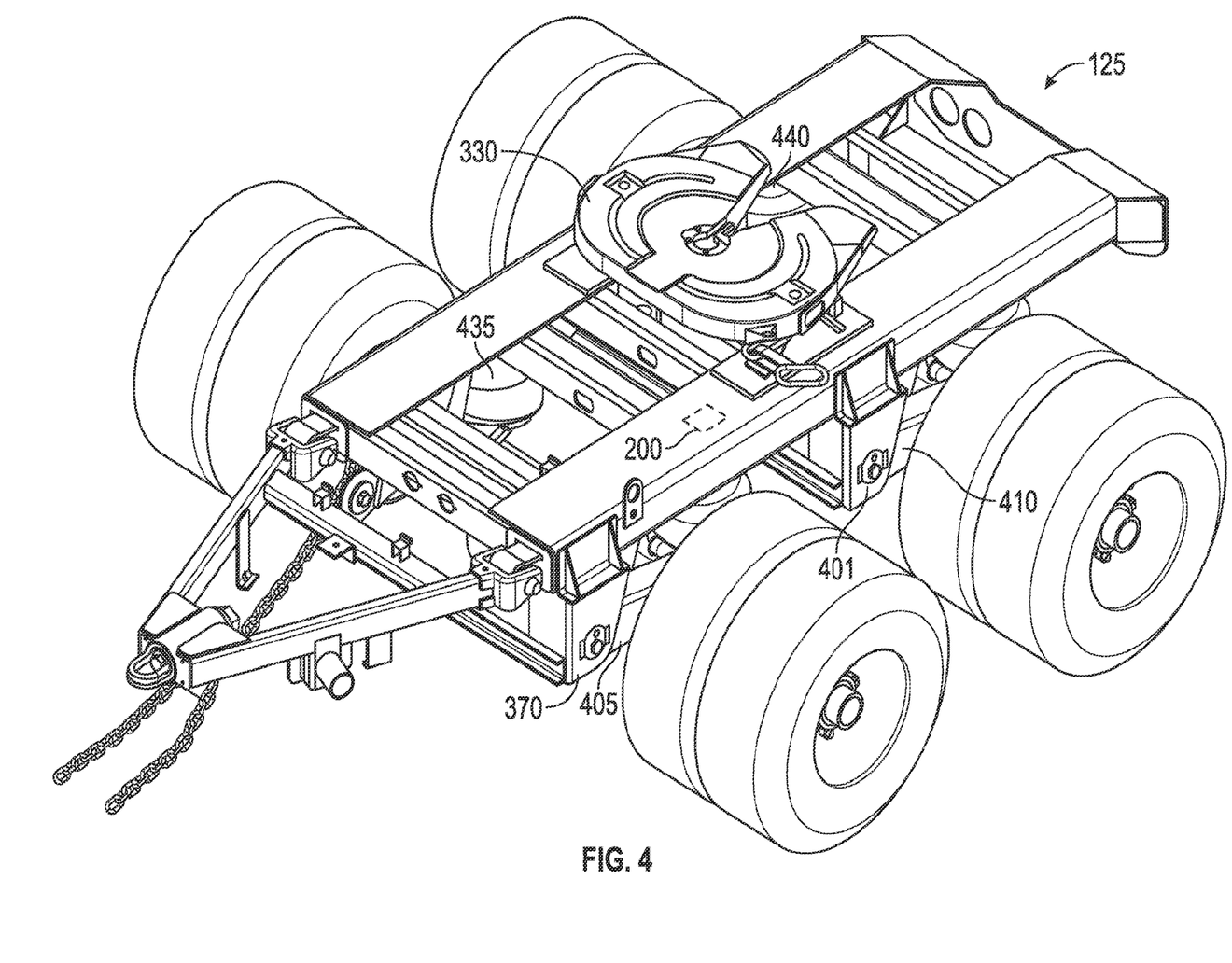
FIG. 4 is an isometric view of the two axle dolly shown in FIG. 2.

As shown in FIGS. 2, 3, and 4, the dolly (125) includes a cart assembly (201) and first and second axles (205, 210). Second axle (210) may be parallel to the first axle (205). Dolly (125) may be configured to distribute weight from the first and second trailers (105, 110) across the first and second axles (205, 210) to permit legal hauling of large loads. The length of the first and second axles (205, 210) may be greater than the length of the axles of the tractor (101) and/or first and second trailers (105, 110). In this embodiment, the extended axle length may provide for enhanced stability and distribution of load weight. First and second axles (205, 210) may have a length of approximately 70 to approximately 90 inches. In embodiments, the length of the first and second axles (205, 210) is approximately 77.5 inches. In these embodiments, the extended first and second axles (205, 210) may be coupled with high quality tire configurations to further distribute axle weight. First and second axles (205, 210) may include, at the termini, tandem (301, 305, 310, 315) or tridem tire configurations. Particularly, first axle (205) may include a first tandem tire set (301, 310), and second axle (210) may include a second tandem tire set (305, 315) parallel to the first tandem tire set (301, 310). See FIG. 3. In an exemplary embodiment, tires may be 295/75R22.5 DCOIN TR100 steel belted radial tires. Tires may be configured to maximize contact surface area with the road. Position of the tires may be optimized along the elongated axle length for stability and maneuverability. At the same time, the overall dolly (125) size may be optimized for maneuverability of the overall system (10). In an exemplary embodiment, tires of first and second trailers (105, 110) are the same size as tires of dolly (125). However, tires of first and second trailers (105, 110) and/or dolly (125) may have varying sizes and configurations. In other embodiments, length of the first and second axles (205, 210) may be lesser than or equal to the length of the axles of the tractor (101) and/or first and second trailers (105, 110). Length and width of the dolly (125) may be varied as needed to support particular applications, including measurement of tilt of dolly (125) described herein.

Dolly cart assembly (201) of the two axle dolly (125) may be manufactured from a variety of materials such as, for e.g., steel and aluminum. In various examples, the cart assembly (201) may include two side rails (320, 325) placed on a plurality of orthogonal cross support members (379, 380), the support members (379, 380) attached to the two tandem first and second axles (205, 210), respectively. See, e.g., FIGS. 2 and 3. Two pedestal josts (215, 340) may be secured to the top of the two side rails (320, 325). Josts (215, 340) may be configured to attach to a fifth wheel jost (330) in a rotatable manner.

Two corresponding hinges (345, 350) and two cable attachment points (355, 360) may be secured to a first end of the two side rails (320, 325) of cart assembly (201). See FIG. 3. Hinges (345, 350) may be secured to a V-shaped assembly (365) with an eye and shank installation (335). However, hinges (345, 350) may be secured to V-shaped assembly via any other attachment mechanisms. V-shaped assembly (365) may have any other shape for attachment to hinges (345, 350). First suspension faculty (370) for the first axle (205) may be secured to the first end of the two side rails (320, 325) of cart assembly (201). See FIG. 3. Second suspension faculty (401) for the second axel (210) may be secured to the middle of the two side rails (320, 325) of cart assembly (201). See FIG. 4. First and second suspension faculties (370, 401) may include respective air suspension hangers with independent arms (405, 410, 435, 440) for each of the tandem tire pairs (301, 305, 310, 315), respectively. See FIGS. 3 and 4.

The components of the dolly cart (125) may be configured in a variety of shapes and sizes depending on the application. In some embodiments, the height of the two side rails (320, 325) from the center of the first and second axles (205, 210) may range from about 10 to about 20 inches. In particular embodiments, the height of the two side rails (320, 325) from the center of the first and second axles (205, 210) is about 14 inches. The distance from the center of the fifth wheel jost (330) to the eye and shank installation (335) may vary depending on the separation distance desired between the first trailer. In some embodiments, this distance is about 98 inches. Depending on factors such as road width, the width of the cart assembly (201) may also be varied. In some instances, the cart assembly (201) may have a width of about 40 to about 70 inches. In a specific embodiment, the cart assembly (201) has a width of about 44 inches.

Tractor (101), first and second trailers (105, 110), first and second containers (115, 120), and/or two axle dolly (125) of the present disclosure may be used in a variety of methods. In embodiments of the present disclosure, tractor (101), first and second trailers (105, 110), first and second containers (115, 120), and/or two axle dolly (125) may be selected based on the volume/weight requirements of a given load. A trailer length exception, if necessary, may be filed with the appropriate state authority and approved. Tractor (101), first and second trailers (105, 110), and/or first and second containers (115, 120) may be loaded and balanced across the dolly (125) such that the weight at the dolly tandem axles (205, 210) may not exceed the legal tandem axle weight limit. Optionally, the load may be additionally balanced as to not exceed any legal axle weight limits.

Figure 5:
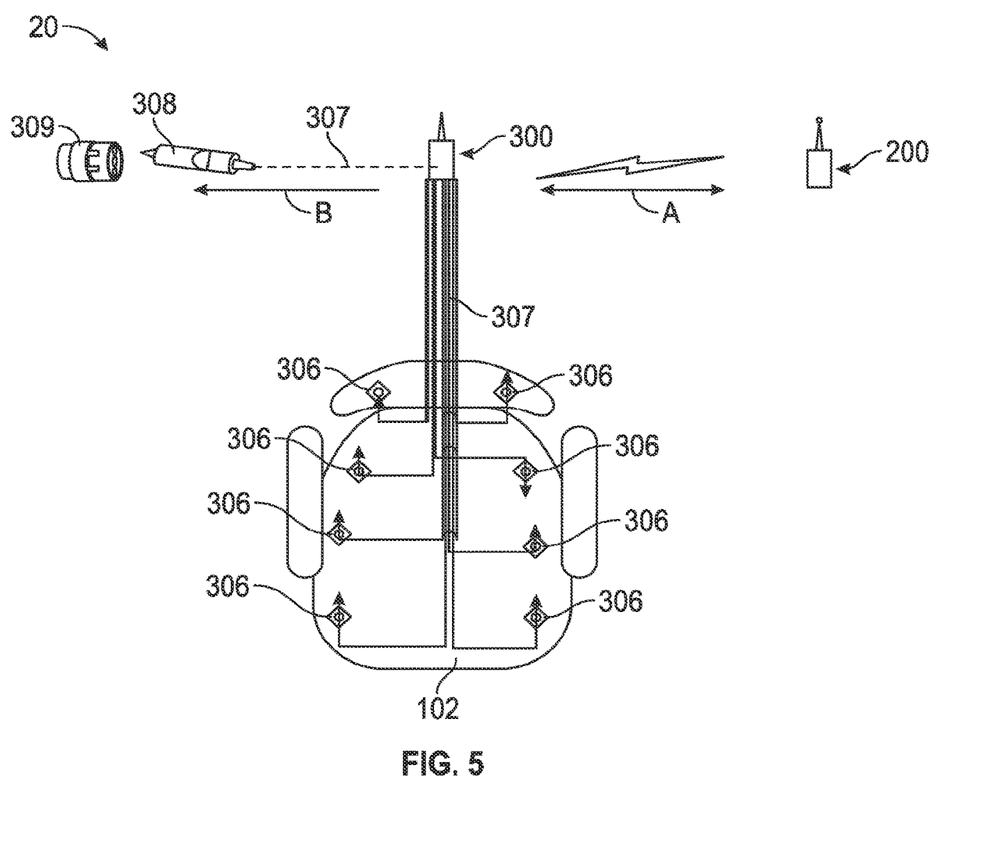
FIG. 5 is a schematic of a sensor feedback system, according to an exemplary embodiment of the present disclosure.

Referring to FIG. 5, a schematic of a sensor feedback system (20) is shown. Sensor feedback system (20) includes a tilt sensor system (200) and a user feedback system (300). As shown, user feedback system (300) is a haptic feedback system. However, user feedback system (300) may also be an audio feedback system, visual feedback system, and/or audiovisual feedback system. Sensor feedback system (20) alerts/provides feedback to a driver of a tractor (101) of dangerous situations such as when containers (for e.g., first and second containers (115, 120)) attached to tractor (101) may be tilting excessively during transportation of freight, thereby allowing the driver to take appropriate corrective action to reduce the excessive tilt.

In embodiments, tilt sensor system (200) may include a housing having at least one tilt sensor and a first communication module/system, both connected to a first microcontroller. Housing of tilt sensor system (200) may be dust-proof, water-proof, and/or shock-proof. The connections between each component in the tilt sensor system (200) may be wireless or wired connections. At least one tilt sensor may be a known inclinometer and/or accelerometer system that measures and obtains tilt information of the dolly (125), first and/or second trailers (105, 110) attached to dolly (125), and/or first and/or second containers (115, 120) attached to first and/or second trailers (105, 110). In an exemplary embodiment, the at least one tilt sensor is the ADIS16210 iSensor® by Analog Devices®. The ADIS16210 iSensor® is a digital inclinometer system that provides precise measurements for both pitch and roll angles over a full orientation range of ±180°. At least one tilt sensor may combine a MEMS (Micro-Electro-Mechanical System) tri-axial acceleration sensor with signal processing, addressable user registers for data collection/programming, and a Serial Peripheral Interphase (SPI)-compatible serial interface. At least one tilt sensor may include unit specific calibration for optimal accuracy performance. It may also offer digital temperature sensor and power supply measurements together with configuration controls for in-system calibration, sample rate, filtering, alarms, I/O configuration, and power management. The MEMS sensor elements may be bound to an aluminum core for tight platform coupling and mechanical stability. An internal clock may drive the data sampling system, which may eliminate the need for an external clock source. The SPI and data buffer structure may provide convenient access to accurate sensor data and configuration controls. In exemplary embodiments, the at least one tilt sensor may be available in a 15 mm×24 mm×15 mm module that provides mounting tabs with M2-sized mounting holes and a flexible, edge terminated connector interface. At least one tilt sensor may also have an extended operating temperature range of about −40° C. to about +125° C. In other embodiments, the tilt sensor(s) may be an inclinometer and/or accelerometer that may interface with microcontrollers and/or wireless or wired communication systems to provide feedback to a user. Other types of sensors may also be used, such as for e.g., lasers.

Sensor feedback system (20) may be integrated into the freight transportation system (10). See FIGS. 1 to 4. Particularly, tilt sensor system (200) may be mounted on frames of the dolly (125) and/or trailers (105, 110) attached to dolly (125), and feedback system (300) may be located within a cabin of a tractor (101) where a driver is seated. See, e.g., FIG. 1. However, sensor feedback system (20) may be used in other transportation or other systems where feedback to an operator/user is desired.

In some embodiments, tilt sensor system (200) is mounted directly on a frame of the dolly (125). See, e.g., FIGS. 1 to 4. In an embodiment, tilt sensor system (200) is mounted on side rail (325) in the middle of cart assembly (201), to obtain measurements of tilt of dolly (125) using the at least one tilt sensor. See FIGS. 2 to 4. In this embodiment, tilt information of first and second containers (115, 120) may be calculated based on tilt information of dolly (125). Dolly (125) described herein may be further modified to obtain tilt measurements. For example, first tandem tire set (301, 310) and second tandem tire set (305, 315) of dolly (125) may be moved further inward or outward such that dolly (125) tilts along with first and/or second trailers (105, 110). In other embodiments, tires (301, 310, 305, 315) of dolly (125) may be modified and/or located in other configurations so as to obtain accurate tilt measurements of dolly (125).

In other embodiments, tilt sensor system (200) may be secured to first and/or second trailers (105, 110), which may be connected to first and/or second containers (115, 120), respectively. In this embodiment, tilt sensor system (200) may include at least a first tilt sensor and a second tilt sensor secured underneath the frames of the first and second trailers (105, 110), respectively. Particularly, tilt sensor system (200) may be secured underneath the frames and to the front of rear tires of first and/or second trailers (105, 110) to obtain tilt measurements of first and/or second containers (115, 120) attached to first and/or second trailers (105, 110). In this embodiment, tilt information of first and/or second containers (115, 120) may be measured based on tilt information of trailers (105, 110) via direct attachment/mounting of containers (115, 120) to trailers (105, 110).

In other embodiments, tilt sensor system (200) may be located in other locations on dolly (125) and/or trailers (105, 110) to account for forward, backward, and/or side-to-side tilt of dolly (125) and/or trailers (105, 110), and thereby obtain accurate tilt measurements. Tilt sensor system (200) may be mounted on the dolly (125) and/or trailers (105, 110) via fasteners, nuts, bolts, adhesives, and/or other attachment mechanisms.

Tilt sensor system (200) may continuously measure/monitor the tilt, i.e. angle of inclination, of the dolly (125), first and/or second trailers (105, 110) attached to dolly (125), and/or first and/or second containers (115, 120) attached to first and/or second trailers (105, 110), via the at least one tilt sensor to obtain tilt information regarding the same. Tilt sensor system (200) may then continuously send the tilt information to the user feedback system (300) via the first communication module. User feedback system (300) may then continuously receive tilt information from tilt sensor system (200), and may vibrate and alert a driver if the tilt information is above a predetermined/dangerous level.

First communication module/system in tilt sensor system (200) may facilitate connection between the tilt sensor system (200) and user feedback system (300). First communication module of tilt sensor system (200) may be a first wireless or wired communication module. First wireless communication module may be a first ZigBee® wireless module. In an exemplary embodiment, first ZigBee® wireless module may be the XBee Pro® Module.

Tilt sensor system (200) and user feedback system (300) may be in constant communication with each other via a ZigBee® wireless connection, shown as arrow A in FIG. 5. Alternatively, tilt sensor system (200) and feedback system (300) may communicate with each other via any other known wired or wireless connections. ZigBee® (also known as the ZigBee® protocol) was developed as an open global standard to address the unique needs of low-cost, low-power, wireless sensor networks. The protocol uses the 802.15.4 physical radio specification as a baseline and adds additional routing and networking functionality. It operates in unlicensed bands worldwide at the following frequencies: 2.400-2.484 GHz, 902-928 MHz and 868.0-868.6 MHz. ZigBee® technology may be used with embodiments of dolly (125) and/or trailers (105, 110) described herein to carry data associated with tilt of dolly (125) and/or trailers (105, 110) through hostile RF environments that routinely exist in transportation applications. Zigbee® may be implemented with embodiments of the present disclosure to address the needs of communication of data with simple structure like, for example, data from the at least one tilt sensor described herein. Alternatively, other types of communication modules/systems may be used to communicate with tilt sensors and/or microcontrollers to provide feedback.

First microcontroller in tilt sensor system (200) may provide power to and activate the at least one tilt sensor, obtain tilt information from the at least one tilt sensor, and determine whether the tilt information, i.e. degree of tilt, is above a predetermined/hazardous level. First microcontroller may be in constant communication with a second microcontroller in the user feedback system (300) via the first communication module and a second communication module in the user feedback system (300). In an exemplary embodiment, first microcontroller is the ATmega 48/88/168/328 AVR® 8-Bit Microcontroller by Atmel®. Alternatively, other types of microcontrollers may be used to communicate with tilt sensors and/or communication modules to provide feedback.

Tilt sensor system (200) may be powered via connections to a power source located on the dolly (125) and/or directly on the tractor (101). Power source may be a battery, direct wired connection into the dolly (125) itself, or any other form of power. In some embodiments, tilt sensor system (200) mounted on the dolly (125) may be powered by a battery. Alternatively, tilt sensor system (200) mounted on the dolly (125) may be powered via connections to a stinger port located on a tractor (101). In other embodiments, at least the first and second tilt sensors of tilt sensor system (200) secured to frames of first and second trailers (105, 110), respectively, may be powered via connections to a stinger port located on a tractor (101). Stinger port may be connected to an external battery source, which may be recharged by the alternator of the tractor (101). In some embodiments, stinger port may be connected to an ion power pack. In this embodiment, wired connections may be connected from the stinger port on the tractor (101) to a custom designed port installed on each of the frames of the first and second trailers (105, 110). Wired connections connected to the stinger port may run along the length of the frame of the first trailer (105) and attach to a first custom port on the first trailer (105), run along the length of the dolly (125), and finally, run along the length of the second trailer (110) and attach to a second custom port on the second trailer (110).

User feedback system (300) may be located within a cabin/cab of a tractor (101). As shown in FIG. 5, user feedback system (300) is a haptic feedback system (300). Haptic/tactile feedback involves the use of advanced vibration patterns and waveforms to convey information to a user. Haptic feedback may utilize a vibrating component such as a vibration motor or a linear resonant actuator which may be driven by an electronic circuit. In some instances, a microcontroller may be used that decides when to activate vibration of a haptic sensor and in what particular pattern, and a dedicated haptic driver chip may be used to control the actuator.

In exemplary embodiments, haptic feedback system (300) is secured to a driver seat (102) of tractor (101). Particularly, haptic feedback system (300), including haptic sensors (306), may be sewed into a seat cover fitted on the driver seat (102) of tractor (101). See, e.g., FIG. 5. In exemplary embodiments, haptic feedback system (300) may include multiple haptic sensors (306) and a second communication module/system, both connected to a second microcontroller. Second communication system may facilitate connection between the tilt sensor system (200) and haptic feedback system (300). Second microcontroller may receive tilt information from the first microcontroller, and when necessary, activate haptic sensors (306).

Second communication module of user feedback system (300) may be a second wireless or wired communication module. Second wireless communication module may be a second ZigBee® wireless module. In an exemplary embodiment, second ZigBee® wireless module may be the XBee Pro® Module. Second microcontroller may be the ATmega 48/88/168/328 Microcontroller by Atmel®. In other embodiments, haptic feedback system (300) may utilize a single chip that includes both a wireless (e.g., ZigBee®) module and a microcontroller, such as for example, the ATmega2564RFR2 chip by Atmel®. However, any other ZigBee® or other type of communication system/module and/or microcontroller may be used. Haptic sensor (306) may be any known industrial grade haptic sensor. In an exemplary embodiment, haptic sensor (306) may be the Uni Vibe™ 34 mm Vibration Motor by Precision Microdrives™.

Each sensor (306) may be sewn inside the seat cover fitted on the driver seat (102), while the other components of haptic feedback system (300), including second communication system and second microcontroller, may be located outside the seat cover. In other embodiments, all components of haptic feedback system (300) may be sewn within the seat cover. The connections may be wired connections (307) that connect to each haptic sensor (306). In other embodiments, the connections may be wireless connections. In the embodiment shown in FIG. 5, the second microcontroller and/or haptic feedback system (300) may be powered via wired connections (307) to, for e.g., a cigarette lighter adapter (308), which may then be inserted into a cigarette lighter connection (309) located adjacent to the driver seat (102) of tractor (101), as shown by arrow B. However, the second microcontroller/feedback system (300) may be powered via other known mechanisms.

In exemplary embodiments, user feedback system (300) may receive continual updates from the tilt sensor system (200) regarding degree of tilt of dolly (125), first and/or second trailers (105, 110) attached to dolly (125), and/or first and/or second containers (115, 120) attached to first and/or second trailers (105, 110), respectively, via ZigBee wireless connection, A, using the first ZigBee wireless module. Haptic feedback system (300) may receive either "OK" or "hazard" signals from the tilt sensor system (200). If the haptic feedback system (300) receives an "OK" signal, it will not engage the haptic sensors (306). However, if the haptic feedback system (300) receives a "hazard" signal (for e.g., when a driver is making a turn but is doing so at an excessive speed or the turn itself is hazardously sharp), indicating excessive/dangerous tilt of the dolly (125), first and second trailers (105, 110), and/or first and second containers (115, 120), it may then energize/engage/turn on the haptic sensors (306). In an exemplary embodiment, the second microcontroller may apply a 5V signal on a voltage line connected to the haptic sensors (306), and thereby activate/energize the sensors (306). Upon engagement/being turned on, the sensors (306) may then alert a driver sitting on the driver seat (102) of tractor (101), via vibration of the seat cover fitted on the driver seat (102), that the dolly (125), first and second trailers (105, 110), and/or first and second containers (115, 120) may be experiencing excessive tilt. When the driver experiences this vibration, he/she may then know to take appropriate correction action (such as for e.g., slowing down or widening the turn of the tractor (101)).

User feedback system (300) may be a visual feedback system, audio feedback system, and/or audiovisual feedback system. The visual system and/or audio system may be separate systems or combined audiovisual systems. In embodiments, visual, audio, and/or audiovisual feedback systems may directly receive tilt information from tilt sensor system (200) via connections to microcontrollers and communication modules, and provide appropriate feedback to a driver. Visual, audio, and/or audiovisual feedback systems may be interconnected with a separate haptic feedback system (300). For example, haptic feedback system (300) may include wired connections (307) from the second microcontroller to the visual, audio, and/or audiovisual systems. The visual, audio, and/or audiovisual feedback systems may be located anywhere within the cabin of the tractor (101).

Visual system may be mounted on a dashboard in the cabin via either permanent or non-permanent attachment mechanisms, for e.g., an adhesive. In exemplary embodiments, the visual system may be a row of green, yellow, and red LEDs (light-emitting diodes). In this embodiment, the visual system may show a green light in normal driving conditions, a yellow light when containers (115, 120) may be tilting towards a dangerous level, and a red light when first and second containers (115, 120) are tilting excessively.

Audio feedback system may be located within the housing of the haptic feedback system (300) or may be a separate system. Audio feedback system may be an audio alarm that may send a low pitched audio signal/alert in normal driving conditions and a high pitched audio signal/alert in situations where first and second containers (115, 120) are tilting excessively. The audio alarms may be horns/sirens that output an audio signal when a voltage is applied to their input power terminals. In other embodiments, audio feedback system may be piezoelectric audible sound transducers—also called tone generators or buzzers—that may deliver a high sound output from a small (milliwatt) energy input. In an exemplary embodiment, the audio feedback system may be piezo buzzers offered by APC International, Ltd.

Figure 6:
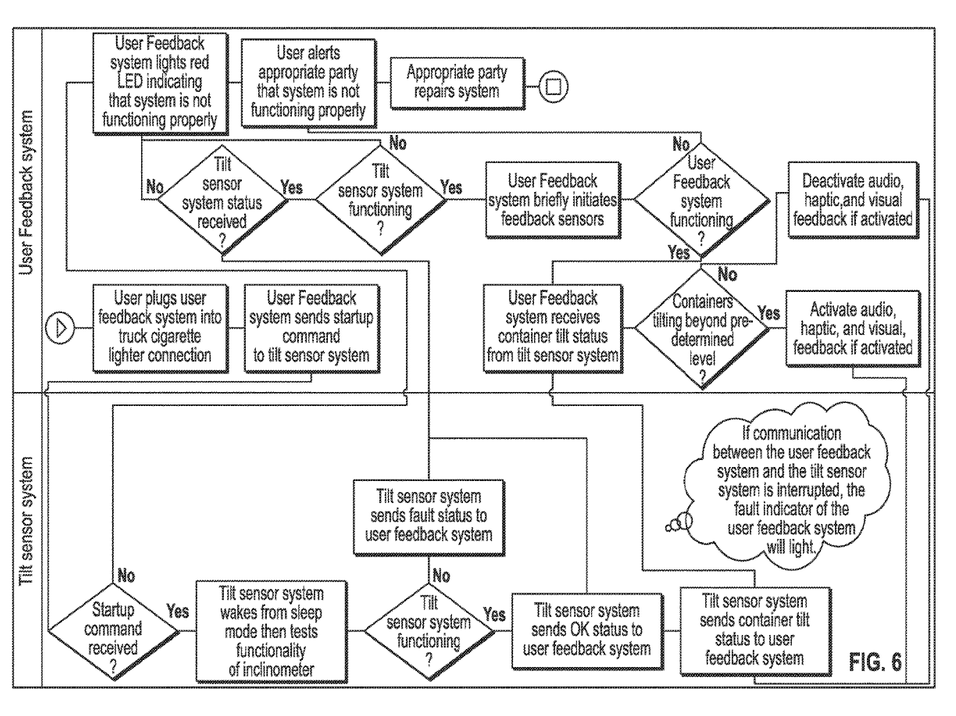
FIG. 6 is a flowchart of a sensor feedback system, according to an exemplary embodiment of the present disclosure.

FIG. 6 is a flowchart showing a sensor feedback system (20) using tilt sensor system (200) and user feedback system (300) described herein. Sensor feedback system (20) described in FIG. 6 may be implemented using the apparatuses, systems and methods described herein, including various embodiments thereof. Sensor feedback system (20) may include the following steps. A user may first plug user feedback system (300) into a cigarette lighter adapter (308), which may be inserted into a cigarette lighter connection (309). User feedback system (300) may then send a startup command to at least one tilt sensor in tilt sensor system (200) described herein. Tilt sensor system (200) may be mounted on dolly (125) and/or first and second trailers (105, 110) described herein. If tilt sensor system (200) does not notify user feedback system (300) of receipt of startup command, user feedback system (300) may alert the user that tilt sensor system (200) is not functioning properly. In exemplary embodiments, user feedback system (300) may be a visual LED system that may show a red light to user indicating non-functioning of the tilt sensor system (200). Once user sees the red light, user may notify an appropriate party that the system (20) is not functioning properly, and repairs may be made to system (20). In other embodiments, user may receive this notification via audio, audiovisual, and/or haptic feedback.

If tilt sensor system (200) receives the startup command from user feedback system (300), the at least one tilt sensor of tilt sensor system (200) may wake up from a sleep mode and test functionality of the system (200). Particularly, tilt sensor system (200) may test functionality of the inclinometer in the system (200). If the tilt sensor system (200) is not functioning properly, the tilt sensor system (200) may send a fault status to feedback system (300), which user feedback system (300) may alert the user as described herein, and appropriate repairs may be made to tilt sensor system (200). If the tilt sensor system (200) is functioning properly, the tilt sensor system (200) may send an "OK" status to user feedback system (300). If user feedback system (300) does not receive the fault status and/or "OK" status from tilt sensor system (200), it may then notify the appropriate party for repairs. In embodiments with a haptic feedback system (300), once it receives an "OK" status, user feedback system (300) may then briefly initiate haptic feedback sensors (306). Again, if the user feedback system (300) is not functioning properly, user feedback system (300) may alert the user as described herein, and appropriate repairs may be made to user feedback system (300).

Once tilt sensor system (200) sends the "OK" status to user feedback system (300), tilt sensor system (200) may then measure tilt information of dolly (125), first and second trailers (105, 110), and/or first and second containers (115, 120) attached to first and second trailers (105, 110) using the at least one tilt sensor. Tilt sensor system (200) may then send this tilt information to user feedback system (300) via a first communication system. User feedback system (300) may receive this tilt information via a second communication system. If the dolly (125), first and second trailers (105, 110), and/or first and second containers (115, 120) are tilting excessively beyond a predetermined level, tilt sensor system (200) may send a warning signal to user feedback system (300). User feedback system (300) may then alert user of this dangerous tilt level via haptic, audio, and/or visual feedback. Once the user takes appropriate corrective action to fix the dangerous level of tilt, tilt sensor system (200) may send an "OK" signal to user feedback system (300), which may then deactivate haptic, audio, and/or visual feedback. If the communication between the user feedback system (300) and the tilt sensor system (200) is interrupted at any time, the tilt sensor system (200) may send a fault status to user feedback system (300), and user feedback system (300) may alert the user as described herein, and appropriate repairs may be made to fix this interrupted communication.

Embodiments provide a method for preparing a load for transport. First container (115) as described herein may be coupled onto a first trailer (105) as described herein, which first trailer (105) may then be connected to a tractor (101). First end of a two axle dolly (125) as described herein may be attached to the first trailer (105). Second trailer (110) as described herein may then be attached to a second end of the two axle dolly (125). Second container (120) as described herein may be coupled onto the second trailer (110). Methods may include connecting the sensor feedback system (20) described herein, including tilt sensor system (200) and user feedback system (300), to at least one of the dolly (125) and/or trailers (105, 110), as well as tractor (101), to receive feedback regarding tilt of the dolly (125), first and/or second trailers (105, 110), and/or first and/or second containers (115, 120). User feedback system (300) may be haptic, visual, audio, and/or audiovisual feedback systems.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted.

What is claimed is:

1. A tilt detection system, comprising:
 a feedback system;
 a dolly configured to be connected to a first trailer at one end, and to be connected to a second trailer at an opposing second end; and
 a sensor system attached to the dolly, the sensor system comprising:
  a multi-axis sensor configured to measure pitch angles and roll angles of the dolly;
  a microcontroller configured to utilize the pitch angles and roll angles of the dolly to calculate a first side-to-side tilt of the first trailer along a first roll axis of the first trailer extending in front of the dolly and a second side-to-side tilt of the second trailer along a second roll axis of the second trailer extending behind the dolly,
 wherein the sensor system alerts the feedback system when the first side-to-side tilt of the first trailer along the first roll axis or the second side-to-side tilt of the second trailer along the second roll axis exceeds a predetermined level.

2. The system of claim 1, wherein the sensor system is configured to be attached to at least one of the dolly, a trailer connected to the dolly, or a container or load secured to the trailer.

3. The system of claim 1, wherein the feedback system includes at least one of a haptic feedback system, an audio feedback system, a visual feedback system, or an audiovisual feedback system.

4. The system of claim 3, wherein the haptic feedback system includes haptic actuators that vibrate and alert a driver that the first side-to-side tilt of the first trailer or the second side-to-side tilt of the second trailer exceeds the predetermined level.

5. The system of claim 3, wherein the audio feedback system provides an audio alert, the visual feedback system provides a visual alert, and an audiovisual feedback system provides an audiovisual alert that the first side-to-side tilt of the first trailer or the second side-to-side tilt of the second trailer is greater than the predetermined level.

6. The system of claim 1, wherein the sensor system alerts the feedback system via a communication system.

7. The system of claim 6, wherein the communication system communicates via at least one of a wired connection and a wireless connection.

8. A transportation system, comprising:
a dolly configured to be connected to a first trailer at one end, and to be connected to a second trailer at an opposing second end;
a tilt sensor configured to detect pitch angles and roll angles of the dolly and of a load being transported by the dolly, and to send tilt information to an external communication system, wherein the tilt sensor comprises a multi-axis sensor configured to measure the pitch angles and the roll angles of the dolly; and
a microcontroller configured to utilize the pitch angles and roll angles of the dolly to calculate a first side-to-side tilt of the first trailer along a first roll axis of the first trailer extending in front of the dolly and calculate a second side-to-side tilt of the second trailer along a second roll axis extending behind the dolly.

9. The transportation system of claim 8, wherein the dolly further comprises:
a first axle system and a second axle system that are configured such that when the dolly is connected to first and second trailers, a load carried by at least one of the first trailer or second trailer is distributed across at least one of the first axle system and the second axle system.

10. The transportation system of claim 8, wherein the dolly includes a cart having a first connection member configured to secure the first trailer to the dolly and a second connection member configured to secure the second trailer to the dolly.

11. The transportation system of claim 10, wherein the dolly further includes a first axle connected to the cart and having a first tandem tire set, a second axle connected to the cart and parallel to the first axle and having a second tandem tire set.

12. The transportation system of claim 10, wherein the cart further includes at least two side rails and orthogonal support members configured to uniformly distribute a load placed on at least one of the first and second trailers onto the first and second axles.

13. The transportation system of claim 8, wherein the tilt sensor is configured to transmit tilt information via a wired or wireless connection.

14. The transportation system of claim 8, wherein the tilt sensor includes an inclinometer.

* * * * *